United States Patent
Erdmann et al.

(10) Patent No.: US 10,772,028 B2
(45) Date of Patent: Sep. 8, 2020

(54) METHOD FOR COMMUNICATING IN A NETWORK COMPRISING A BATTERYLESS ZIGBEE DEVICE, NETWORK AND DEVICE THEREFOR

(75) Inventors: Bozena Erdmann, Eindhoven (NL); Armand Michel Marie Lelkens, Eindhoven (NL); Willem Franke Pasveer, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 897 days.

(21) Appl. No.: 13/201,291

(22) PCT Filed: Feb. 10, 2010

(86) PCT No.: PCT/IB2010/050604
§ 371 (c)(1),
(2), (4) Date: Aug. 12, 2011

(87) PCT Pub. No.: WO2010/092530
PCT Pub. Date: Aug. 19, 2010

(65) Prior Publication Data
US 2011/0294431 A1   Dec. 1, 2011

(30) Foreign Application Priority Data
Feb. 13, 2009   (EP) .................................... 09305136

(51) Int. Cl.
*H04W 40/24* (2009.01)
*H04W 40/12* (2009.01)

(52) U.S. Cl.
CPC .......... *H04W 40/246* (2013.01); *H04W 40/12* (2013.01); *Y02D 70/122* (2018.01);
(Continued)

(58) Field of Classification Search
CPC .................................................... H04W 88/04
(Continued)

(56) References Cited

U.S. PATENT DOCUMENTS 6,678,535 B1 * 1/2004 Narayanaswami ..... H04L 69/08
370/466
6,862,448 B1 * 3/2005 Bims ........................ H04B 7/02
370/331
(Continued)

FOREIGN PATENT DOCUMENTS

JP   2000048292 A   2/2000
JP   2002111689 A   4/2002
(Continued)

OTHER PUBLICATIONS

S. A. Chaudhry et al, "A Proxy-Enabled Service Discovery Architecture to Find Proximity-Based Services in 6LoWPAN", Jan. 1, 2006 (Jan. 1, 2006), Embedded and Ubiquitous Computing Lecture Notes in Computer Science; LNCS, Springer, Berlin, DE, pp. 956-965, XP019041786.

*Primary Examiner* — Wen W Huang
(74) *Attorney, Agent, or Firm* — Daniel J. Piotrowski

(57) ABSTRACT

The present invention relates to method for wireless communicating in a network comprising a resource-constrained end device, and a first router device, wherein the method comprises the following steps:—the end device (ZBLD) sending a trigger for proxy search procedure,—the first router (R1) device receiving the trigger for proxy search procedure, the first router (R1) determining whether it fulfills conditions for acting as a router for the end device, and in case conditions are fulfilled, the first router appointing itself as a proxy router for the end device, for relaying communication between the end device and the rest of the (Continued)

network. The invention also relates to an end device, a router device, and net work therefor.

20 Claims, 2 Drawing Sheets

(52) U.S. Cl.
CPC .......... *Y02D 70/144* (2018.01); *Y02D 70/162* (2018.01); *Y02D 70/34* (2018.01)

(58) Field of Classification Search
USPC ...................................... 455/41.1, 41.2, 41.3
See application file for complete search history.

(56) References Cited

U.S. PATENT DOCUMENTS

| | | | | |
|---|---|---|---|---|
| 6,879,806 | B2* | 4/2005 | Shorty | H04L 12/2803 340/12.51 |
| 7,349,326 | B1* | 3/2008 | Zadikian | H04L 12/437 370/216 |
| 7,551,895 | B1* | 6/2009 | VanLaningham | H04W 40/06 370/243 |
| 7,869,763 | B2* | 1/2011 | Lee | H04L 45/48 455/41.2 |
| 7,890,112 | B2* | 2/2011 | Ito | H04W 40/24 370/310 |
| 8,010,041 | B2* | 8/2011 | Wang et al. | 455/7 |
| 8,275,313 | B1* | 9/2012 | Myers | H04W 84/18 455/41.2 |
| 8,738,013 | B2* | 5/2014 | Banerjea | H04L 45/26 370/238 |
| 2002/0191573 | A1* | 12/2002 | Whitehill | H04L 1/0002 370/338 |
| 2003/0195005 | A1* | 10/2003 | Ebata | H04W 40/06 455/445 |
| 2005/0096031 | A1* | 5/2005 | Sugaya | H04W 72/10 455/422.1 |
| 2007/0141991 | A1* | 6/2007 | Hong et al. | 455/63.1 |
| 2007/0178831 | A1* | 8/2007 | Takeda | H04B 7/2606 455/7 |
| 2007/0186105 | A1* | 8/2007 | Bailey | H04L 63/0492 713/168 |
| 2007/0268920 | A1* | 11/2007 | Allard-Jacquin | H04W 92/02 370/401 |
| 2008/0089277 | A1* | 4/2008 | Alexander | H04L 12/2816 370/328 |
| 2008/0117823 | A1* | 5/2008 | Krishnakumar et al. | 370/236 |
| 2008/0212494 | A1* | 9/2008 | Thubert | H04L 45/025 370/254 |
| 2008/0254743 | A1* | 10/2008 | Nishikawa et al. | 455/24 |
| 2008/0291855 | A1* | 11/2008 | Bata | H04W 52/0219 370/311 |
| 2009/0059919 | A1* | 3/2009 | Kim | H04W 48/12 370/389 |
| 2009/0094349 | A1* | 4/2009 | Smith | H04L 12/66 709/220 |
| 2009/0130974 | A1* | 5/2009 | Yoneda | 455/7 |
| 2010/0136988 | A1* | 6/2010 | Dewasurendra et al. | 455/450 |
| 2010/0195557 | A1* | 8/2010 | Aoki | H04W 52/0216 370/312 |
| 2011/0011928 | A1* | 1/2011 | Varone | H04L 67/04 235/380 |
| 2011/0269397 | A1* | 11/2011 | Bella | H04B 7/15507 455/11.1 |

FOREIGN PATENT DOCUMENTS

| | | |
|---|---|---|
| JP | 2005110288 A | 4/2005 |
| JP | 2005150882 A | 6/2005 |
| JP | 2008306474 A | 12/2008 |
| WO | WO2005104484 A1 | 11/2005 |
| WO | WO2008048933 A2 | 4/2008 |
| WO | WO2008099308 A2 | 8/2008 |

* cited by examiner

METHOD FOR COMMUNICATING IN A NETWORK COMPRISING A BATTERYLESS ZIGBEE DEVICE, NETWORK AND DEVICE THEREFOR

FIELD OF THE INVENTION

The present invention relates to a method for communicating in a wireless control network. More particularly, the present invention relates to a method for ensuring maintenance of a communication link between a communication device and a router in a wireless network.

This invention is, for example, relevant for wireless networks comprising devices having low power resources. In a specific application, the present invention is relevant for wireless networks using communication protocols compliant with the IEEE802.15.4 and also IEEE802.15.4-based protocols, e.g. ZigBee protocol.

BACKGROUND OF THE INVENTION

Wireless control networks have recently become a ubiquitous trend in the field of communication, especially for building management systems. Wireless technologies present major advantages in terms of freedom of placement, portability, and installation cost reduction, since there is no need for drawing cables and drilling. Thus, such technologies are particularly attractive for interconnecting, detecting, automation, control or monitoring systems using sensor devices such as light switches, light dimmers, wireless remote controllers, movement or light detectors, that have to be set up in distant places one from the other and from the devices they control, e.g. lights.

One of the drawbacks appearing in networks of the like relates to device powering. Indeed, since the devices are not wired, they can not anymore receive power necessary for performing all the operations required in the network form the mains or via the connection with the controller. Thus, it has been envisaged to equip such devices with built-in batteries. However, since the devices are quite size-constrained, batteries may not be of a large size, which results either in a reduced device lifetime, or in labour intensive battery replacement.

It has been suggested to remedy this issue by equipping sensor devices with self-sustained energy sources that harvest energy from its environment. Still, the amount of energy achievable by off-the-shelf energy harvesters is very limited, which means that the features and functions of the batteryless devices are heavily restricted accordingly.

Among the functions that are mandatory to be maintained for good operation in a wireless network is the link connection, which makes it possible to ensure at any time that a resource restricted device is linked to a router which forwards messages on its behalf. In existing implementations therefore, a parent-child relationship is established between an end device, generally resource-restricted, and its parent. The child end device addresses all its communication to the parent for being forwarded to their final destination. However, in case of energy-harvesting device, this relationship creates a single point of failure in the network, because in case the parent link is broken, communication from the end device can not be successfully performed anymore. Moreover, in most cases, such a failure may not even be detected by the end device, due to non-existent or not used return path, or insufficient energy.

Thus, there is a need for a method of communicating ensuring maintenance of good operation in a wireless control network. Moreover, as explained before, there is a need for a method that can be carried out without using too many resources of the end device, since those devices are generally resource-constrained, namely in terms of energy resources.

SUMMARY OF THE INVENTION

It is an object of the invention to propose a method solving at least some of the above-mentioned issues. More particularly, the present invention aims at providing a method of communication in a network comprising at least a resource-constrained device, further called end device, and at least one resource-rich router device, further called router.

It is a further object of the present invention to propose a method that allows limiting power consumption at the end-device for configuration and/or/maintenance of the network.

It is another object of the invention to propose a method that eliminates the need for pre-configuring the end device.

Yet another object of the invention is to provide a method avoiding any performance limitation resulting from the special relationship between the pre-configured parent and the resource-constrained or batteryless device, in case of a change in the network.

To this end, the invention relates to a method for wireless communicating in a network comprising a resource-constrained end device, and a first router device. The method comprises the following steps:
the end device sending a trigger for proxy search procedure,
the first router device receiving the trigger for proxy search procedure,
the first router determining whether it fulfills conditions for acting as a router for the end device, and
in case conditions are fulfilled, the first router appointing itself as a proxy router for the end device, for relaying communication between the end device and the rest of the network.

With such a method, the only action performed by the end device for solving the issue of a missing proxy is sending a command frame for triggering the proxy search procedure. Thus, this method allows maintaining good operation in the network with using as little energy as possibly by the end device.

In an embodiment of a method according to the invention, the trigger for the proxy search procedure allows for identification of the end device. In this case, the determination step comprises:
the first router device determining, based on the identification element, whether it is linked to the end device,
in case the end device is linked determining that the conditions are fulfilled,
in case the end device is not linked, checking whether the first router device can be linked itself to the end device.

This method is such that only the router device can determine whether it is linked to the end device or not. Within the meaning of the present invention, a router is linked to an end device when it is registered as a parent for this end device. Indeed, the end device is absolutely not aware of the identity of the router, which eliminates the need for any pre-configuration of the end device, and allows automatic adaptation to changing conditions and to parent replacement without further involvement of the end device.

In another embodiment, a method according to the invention comprises the following steps:
determining a performance indicator of the link between the end device and the first router device, comparing this performance indicator with a predetermined criteria, and in case the performance indicator is fulfills the predetermined criteria, determining that the first router device can be proxy router for the end device.

The performance indicator is, for example, a link cost indicator, or the fact of the router application being controlled by the end device. Such a feature allows ensuring that the router appointed during a proxy search method according to the invention is the one ensuring the best transmission performance in the network.

In a particular embodiment, a method according to the invention comprises a proxy resolution procedure which makes it possible for a router to inform other routers in the network of its intention to become the parent router for the end device that triggered the proxy search procedure. For example, the proxy resolution procedure comprises a step of the router, having decided to become a parent for a device, sending a proxy resolution message. This message is, for example, sent after a delay determined on the basis of a performance indicator of the link between the end device and the router.

The invention also relates to a method comprising a resolution procedure in case of two routers deciding at the same time to become a parent router for an end device.

The present invention also relates to a router device comprising:
wireless reception means for receiving data frames and command frames from other devices in a wireless network,
wireless transmission means for transmitting acknowledgment messages and resolution messages,
transmission means for forwarding end device messages,
comparing means for comparing address of the router device with other addresses,
memory means for storing a neighbor table, wherein the table comprising a list of end devices and the status of the relationship between the router device and each end device.

Another aspect of the invention relates to an end device comprising:
wireless transmission means for sending data and triggering the proxy search procedure;
wireless transmission means for receiving at least acknowledgement messages;
means to track the acknowledgements and decide on triggering the proxy search procedure;
limited energy resources.

Yet another aspect of the invention relates to a network comprising at least one end device and one router device according to the invention.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
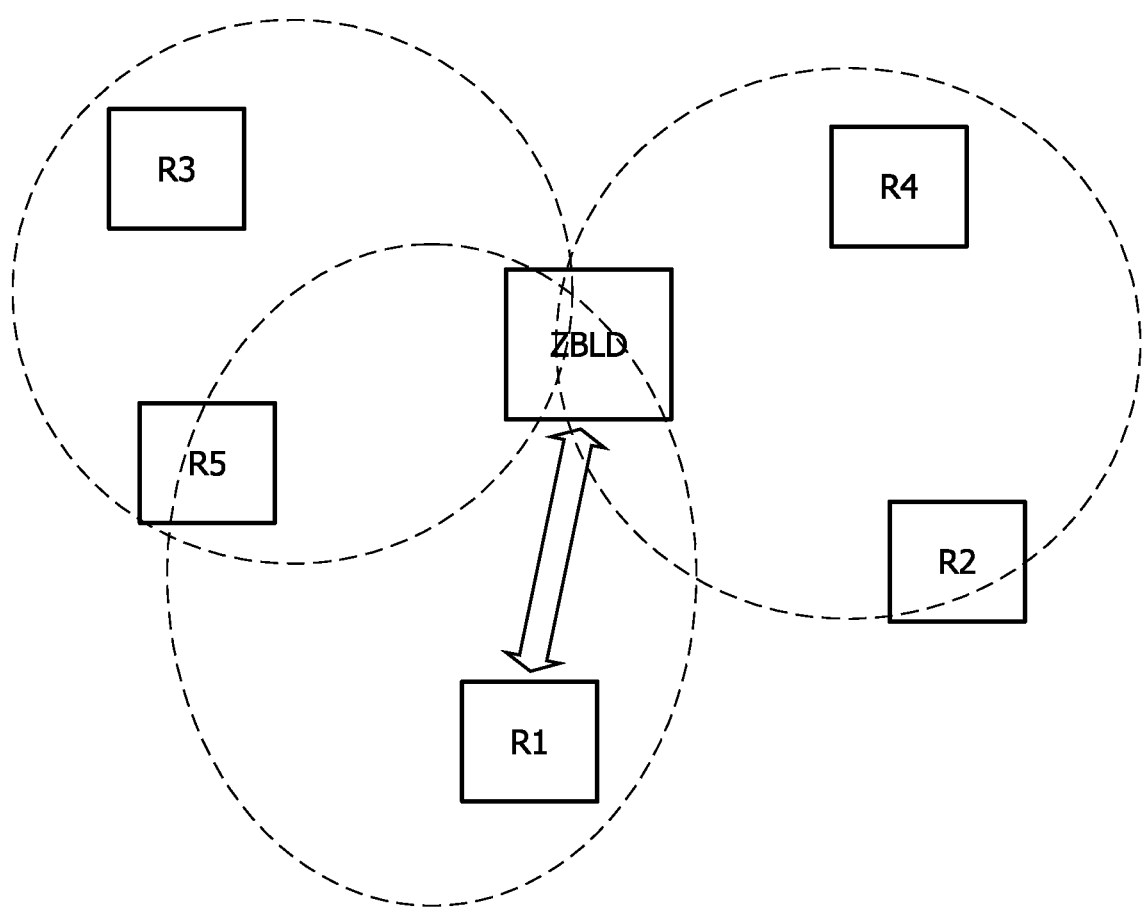
FIG. 1 shows a network according to the invention.

The present invention relates to a method of communicating in a wireless control network as shown in FIG. 1. The network comprises an end device. This device is, for example a Zigbee Batteryless Device (ZBLD), but the invention finds application with any resource-constrained wireless device, especially battery-powered or energy-harvesting devices, such as light switches, light dimmers, wireless remote controllers, movement detectors, or light detectors. The network also comprises several router devices (R1, R2, R3, R4, R5). These router devices are, in an exemplary embodiment, compliant with Zigbee communication protocols. In another advantageous embodiment, the ZigBee Batteryless Device and the routers are compliant with a lightweight 802.15.4-based batteryless protocol.

In this network, a relationship is established between the end device and one of the routers, R1 in the present example. Whenever the end device transmits a frame, the router is in charge of forwarding it. When the router correctly receives the transmitted frame, it sends an acknowledgment message to the end device, on the MAC layer. As long as the end device receives such a MAC ACK frame on its transmission, it is assured that its network connection is alive. The end device does not know the identity of the router.

However, when the connection is lost, such loss being identified by a missing ACK, there is a need to trigger a method for establishing a new connection, in order to maintain correct communication in the network. As previously mentioned in the present application, since end devices used in such networks are constrained in terms of resources, especially power, it is necessary to provide methods that allow correct operation of the network without involving too much power spending for the end device. The invention thus provides a method fulfilling these requirements. When the end device does not receive an acknowledgment message, it triggers a "proxy search" procedure, to indicate to surrounding router devices in the network that it has lost a parent, and needs a new one. Triggering the proxy search procedure can be done, for example, by sending a proxy search command frame, or by inserting a flag in the data frame and resending it. Triggering is the only action performed by the ZBLD in this proxy search procedure, which means that only small amount of energy is required in the ZBLD for performing the method.

It is beneficial that the information regarding batteryless devices is stored in all routers in the end device's neighbourhood, and that the end device can be recognized as such. In this view, in 802.15.4, each router comprises memory means for storing a neighbour table. In an exemplary embodiment, information regarding a ZBLD is stored in a "Device Type" field of the neighbour table entry. The table entry also includes a relationship field containing the type of relationship between the ZBLD and the router device, such as "child", "previous child", "none". In an alternative embodiment, the identification element of a ZBLD is stored directly in the relationship field, along with the relationship status, such as "ZBLD child" or "ZBLD unrelated".

A network according to the invention is such that a ZBLD does not require any special joining procedure. It is not configured with any parent address, nor the parent be configured with the ZBLD's address, which avoids any pre-configuration procedure, thus simplifying and shortening the installation and configuration procedure. Thus, for a 802.15.4/ZigBee network, the ZBLD only needs to be configured with a channel number, network identifier (PANId) and a unique identifier (NWK address). As regards the application layer configuration, the ZBLD is preferably configured with the multicast address of the group of devices controlled by such ZBLD, which allows for flexible reconfiguration of group membership, without ZBLD involvement. Thus, the ZBLD uses group identifiers to address its application-layer command to the appropriate actuators, which have to be configured as group members. In ZigBee, those group identifiers are in the application support sub-layer or network level. Thus, the ZBLD has to be configured additionally with the group ID it is the source of, and all actuators devices to be controlled by that ZBLD must be configured as members of this group.

In a network according to the invention, the link between a ZBLD and a router is not fixed, which enables a high mobility for both the ZBLD and the router, and also allows for an automatic adaptation to parent replacement, for example due to changing propagation conditions leading to break of a link between an end device and a router device, without a burden on the ZBLD side.

Accordingly, it appears that, in a network according to the invention, the ZBLD's normal operation simply consists in sending data frames to other devices in the network. As explained before, on the MAC level, the ZBLD sends a data frame to be forwarded by the proxy router, and then waits for an acknowledgment message. The structure of this message and the nature of the ZBLD device communication is such that only the reception, or not, of the acknowledgment message is tracked, but not the origin of the message. Thus, in case the message is actually received, the ZBLD does not need to know which router has handled its message to be transmitted, and in case the message is not received, the ZBLD can not identify, and does not need to identify which link has failed.

Once the proxy search procedure is triggered, the proxy search command frame is received by one or several router devices of the network.

Figure 2:
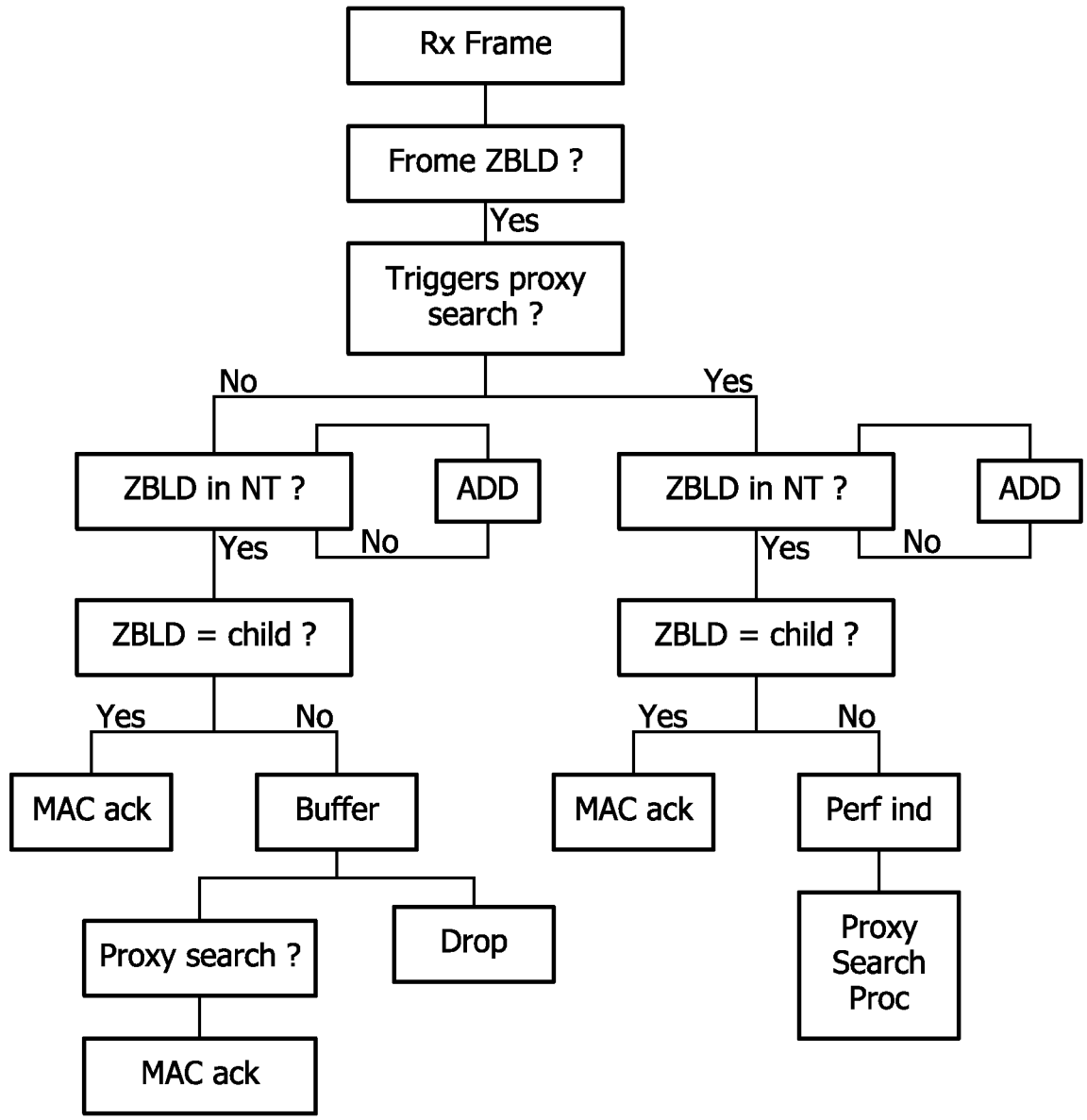
FIG. 2 is a block diagram of an operating sequence in a router device set up in a network according to the invention.

We will now describe, in connection with FIG. 2, operations performed at a router device of the network when receiving a frame ("Rx Frame").

First of all, the router device identifies whether the frame comes from a Zigbee batteryless device ("From ZBLD?"). This identification is performed, for example, by checking the content of a device type field included in the frame.

If the originator of the frame is actually a ZBLD, the router device then determines if the received frame triggers the proxy search procedure ("Triggers Proxy search").

Let's assume in the first case that the proxy search is not triggered, i.e. that the frame is a pure data frame. The router device determines if the ZBLD having originated the frame belongs to its network ("ZBLD in NT"). The determination is performed e.g. by checking whether the identifier of the ZBLD is stored in the neighbour table of the router device. If the ZBLD is not yet present in the table, the router device adds it ("ADD") with the relationship status "unrelated". If, on the contrary, the ZBLD is already present in the table, the router device checks the relationship status of the ZBLD ("ZBLD=child?"):

if the ZBLD is a child, the router device forwards the data frame and sends an acknowledgment message ("MAC ACK") to the ZBLD, if the ZBLD is not a child, the router device buffers ("BUFFER") the data frame, and launches a "proxy timeout". If a "proxy search" message is received for this particular ZBLD during the timeout, and the router becomes a new parent, the router device forwards the data frame. If not, the data frame is dropped.

Now let's assume that the frame triggers the proxy search procedure, e.g. via a dedicated proxy search command frame sent by a ZBLD or a flag set in a data frame. The router device checks whether the ZBLD source is listed in the neighbour table of the router device ("ZBLD NT?"). If it is, the device determines the relationship status ("ZBLD=child?"), and if it is a child, the router device sends a MAC ACK frame to the ZBLD ("MAC ACK").

If the ZBLD device is not listed in the neighbour table, the router device adds it, with the status "unrelated". Then, the router device determines a performance indicator, e.g. the link cost indicator ("PERF IND") for the incoming wireless link from the child or a number of packets already received from this device. Further, link cost would be used as performance indicator example. If the link cost indicator is better than a predetermined number, for example 3, then the router device triggers a proxy resolution procedure after a random delay.

The proxy resolution procedure comprises the following steps:

a first Zigbee router having a link cost to the ZBLD smaller than 3 and having received a trigger for the proxy search procedure from the ZBLD sends a 3-hop broadcast (i.e. with broadcast range or time to live equal to 2) "proxy resolution" message, addressed to all other routers of the network, indicating its intention to become a new proxy for this particular ZBLD, upon receipt of such a message, a second router stores the proxy resolution message in a memory, to avoid duplicates, and re-broadcasts it, if the ZBLD originating the proxy search is not listed in the neighbour table of the second router, no action is performed; however, if the ZBLD is listed, the second router performs a comparison to determine, based on the performance indicator for the ZBLD and on the proxy resolution message, whether it should act, or not, as a router for the ZBLD.

The choice between the first and second router for acting as router for the ZBLD can be made according to different criteria. In an exemplary embodiment, the second router compares the originator address in the proxy resolution message, which is the address of the first router device, with its own address. If its own address is smaller and if the cost link is appropriate, depending on the predetermined cost link indicator used in the present method, the second router device should become the proxy. In this view, it initiates a "proxy resolution" with is own address as the originator.

If the address of the second router is lower, but the link cost is inappropriate, then the second router only re-broadcast the proxy resolution message received from the first router.

The following sections discuss exemplary details of the implementation in 802.15.4/ZigBee.

The implementation of the trigger of the proxy search procedure as a "proxy search" command frame on the MAC layer assures that the command is very short, which avoids higher layer overhead, or network and application layer overhead, in 802.15.4/ZigBee. Thus increases the chances of the ZBLD being able to send it with the limited energy it harvested. The only data that is required in this command is the identifier of the ZBLD (already present in the 802.15.4 MAC header) so the "proxy search" frame can be payloadless. To further shorten the packet, the destination address and destination network identifier (in 802.15.4/ZigBee: PAN identifier, PANId) can be skipped, and only the source address and source network identifier PANID sent; the Intra-PAN bit of the Frame control should be set. Thus, the total length of the "proxy search" command (incl. PHY layer overhead) would be 15B.

Because the broadcast "proxy resolution" is sent only across two hops, it should be kept in the BTT by much shorter time than the ZigBee nwkBroadcastDeliveryTime of 10s (for ZigBee PRO), to allow for repeated discovery, if required, and to clear the BTT in appropriate time. The "proxy resolution" command can be located in the network layer or above. e.g., the ZigBee Network Status command could be used with a new Status code.

In another embodiment, the trigger for the proxy search procedure may be part of the data frame, e.g. one of the reserved sub-fields of the MAC or NWK Frame Control field. This has the benefit of increasing the chance of getting the original ZBLD control message across.

Even if a method according to the invention comprises features for choosing between several potential routers, it may happen that the proxy resolution protocol results in two routers independently assuming the proxy role for a particular ZBLD. This situation may occur, for example, in networks with very varying router density, as depicted in connection with FIG. 1. In the figure, R1 can only see R5, but not any other nodes (R2-R4); R5 can see R3, and R2-R4 can all see each other. Thus, R1, R3 and R5 run the resolution protocol, and R1, with the lowest address, assumes the role of ZBLD proxy, and independently R2-R5 run the proxy resolution protocol, and decide on R2 to become the proxy. Ranges of the router devices are shown by dotted circles on the figure.

This situation cannot be discovered by the routers, because they cannot deduce it from the ZBLD's packets, as the parent address is not included there, and the two proxy routers R1 and R2 are not in each other's range, thus cannot know e.g. about colliding ACK frames.

One possibility is for ZBLD to discover the ACK collisions, and re-triggering the "proxy search" procedure across more hops, i.e. with higher Time-To-Live.

Another possibility is to include the originator's address in the "proxy resolution" command and—in the proxy resolution process—for any of the intermediate nodes (in the example above, R3-R5), to forward the information on the router with the lowest address to the other competing proxies, those with the previously lowest address, independent of the hop count, e.g. in unicast or by increasing the hop count in the re-broadcast packet.

Yet another possibility is for all routers in the direct vicinity of the ZBLD to use the ZBLD's identifier as a group identifier, with all routers in the wireless range of the ZBLD being members of this group; any proxy search message sent by the ZBLD and any proxy resolution message initiated by the neighbour routers may then be addressed to this group address and thus have a good chance of reaching all router neighbours.

Optionally, the "proxy search" frame can have 2-byte payload, containing the identifier of the group this ZBLD controls. This information would have to be carried then in the "proxy resolution" frame exchanged by the routers, together with the information of the particular router is member of this particular group. The resolution protocol could then be modified as follows:
The member routers use shorter random delay;
they drop own scheduled "proxy resolution" transmission ONLY on reception of same packet from another member router,
the new proxy is the member router, with the lowest address.

Alternatively to all ZBLD neighbour routers buffering the data frame for proxy timeout, only the routers being also neighbours of the ZBLD's proxy could do so, e.g. by eavesdropping on the MAC ACK sent by the proxy. During proxy timeout, they would listen for the MAC ACK to be sent, and if none comes, one of them "takes over", i.e. re-transmits the data packet and triggers the "proxy resolution procedure", to be resolved solely among the previously eavesdropping routers.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of wireless control networks and which may be used instead of or in addition to features already described herein.

The invention claimed is:

1. A method for wireless communication in a network, wherein the network includes a parent-child relationship between a child-end device and its parent-end router device, the method comprising:
    sending, via the child-end device which is power constrained, wherein the child-end device addresses all communication to its parent-end router for forwarding to a final destination, a trigger to enable a proxy search procedure, when an acknowledgement message from an old parent-end router configured to relay communication between the child-end device and the network is not received, and wherein an identity of the parent-end router is unknown to the child-end device during said communication with the parent-end router;
    receiving, at a first parent-end router device, the trigger for the proxy search procedure,
    in response to the trigger for the proxy search procedure, determining whether the first parent-end router device fulfills a condition for acting as a new proxy router for the child-end device in place of the old parent-end router;
    appointing the first router device as the new parent-end router for the child-end device when the first parent-end router device fulfills the condition.

2. The method as recited in claim 1, wherein determining whether the first parent-end router device fulfills the condition comprises:
    determining that the conditions are fulfilled, when the parent-end first router device is linked to the end device based on the identification of the child-end device; and
    linking the first parent-end router device to the child-end device, when the first parent-end router device is not linked to the child-end device.

3. The method as recited in claim 2, further comprising:
    determining a performance indicator of a link between the child-end device and the first router device,
    comparing the performance indicator with a predetermined criteria, and
    appointing the first parent-end router device as the new parent-end router for the child-end device, when the performance indicator fulfills the predetermined criteria.

4. The method as recited in claim 3, wherein the performance indicator is a link cost indicator.

5. The method as recited in claim 3, wherein the performance indicator indicates whether a parent-end router application is being controlled by the child-end device.

6. The method as recited in claim 2, further comprising sending, via the first parent-end router device, a proxy resolution message.

7. The method as recited in claim 6, wherein the proxy resolution message is sent after a delay based on a performance indicator of a link between the child-end device and the first parent-end router device.

8. The method as recited in claim 1, further comprising:
receiving, by a second parent-end router device within a transmission range of the first parent-end router device, the trigger for the proxy search procedure and a proxy resolution message from the first parent-end router device;
determining whether the first router device and the second parent-end router device are linked to the child-end device; and
determining whether the second parent-end router device is the new parent-end router for the child-end device, based on the proxy resolution message, an end device identification, and a performance indicator of links between the end device and the first and second router devices.

9. The method as recited in claim 8, wherein determining whether the second parent-end router device is the new parent-end router further comprises:
determining whether the second parent-end router device is linked to the child-end device;
determining, via the second parent-end router device, the performance indicator for the child-end device;
comparing an address of the second parent-end router device with an address of the first parent-end router device; and,
sending a proxy resolution message when the address of the second parent-end router device is lower than the address of the first parent-end router device.

10. The method as recited in claim 8, further comprising:
receiving, by a third parent-end router device situated out of the transmission range of the first parent-end router device, the proxy search procedure comprising a proxy search command frame;
appointing the third parent-end router device as the new parent-end router for the child-end device when the first parent-end router device and the third parent-end router device fulfill the conditions for acting as the new parent-end router for the child-end device; and
the child-end device sending a proxy resolution command frame when a collision between the acknowledgment messages is detected.

11. The method as recited in claim 10, wherein a group identifier is used for communication of the proxy resolution command frame between the routers in a wireless range of the child-end device.

12. The method as recited in claim 1, wherein the network is an 802.15.4/ZigBee network.

13. The method as recited in claim 1, wherein the proxy search trigger is implemented as a command frame on a MAC layer.

14. The method as recited in claim 1, wherein the proxy search procedure indicates to parent-end router devices in the network that the child-end device has lost connection with the old parent-end router and needs a new parent-end router device.

15. The method as recited in claim 1, wherein end device is a battery less device or an energy-harvesting device.

16. A method for communicating in a network, wherein the network includes a parent-child relationship between a child-end device and its parent-end router device, the method comprising:
the child-end device, which is power constrained, wherein the child-end device addresses all communication to its parent-end router, sending a data frame to be forwarded by an old parent-end router to a destination;
the child-end device waiting for reception of an acknowledgment message during a predetermined time from the only parent-end router;
sending, via the child-end device, a trigger to enable a proxy search procedure, when the acknowledgement message from the old parent-end router is not received, and wherein an identity of the parent-end router is unknown to the child-end device during said communication with the parent-end router;
receiving, at a first parent-end router device, the trigger for the proxy search procedure;
in response to the trigger, determining whether the first parent-end router device fulfills a condition for acting as a new parent-end router for the child-end device in place of the old parent-end router; and
appointing the first parent-end router device as the new parent-end router for the child-end device when the first parent-end router device fulfills the condition.

17. The method as recited in claim 16, wherein the network is an 802.15.4/ZigBee network.

18. A system for communicating in a network, wherein the network includes a parent-child relationship between a child-end device and its parent-end router device, the system comprising:
the parent-end router device having,
a wireless receiver configured to receive a data frame and a command frame from its child-end device, wherein the child-end device addresses all communication to its parent-end router for forwarding to a final destination, and wherein an identity of the parent-end router is unknown to the child-end device during said communication with the parent-end router, a wireless transmitter configured to transmit an acknowledgment message and a resolution message, in response to a proxy search request trigger, such that the parent-end router device replaces another parent-end router device;
a transmitter configured to forward a child-end device message, in response to the proxy search request trigger;
a comparator configured to compare an address of the parent-end router device with an address of at least one child-end device, in response to the proxy search request trigger; and
a memory configured to store a neighbor table, wherein the table comprises a list of child-end devices and a status of a relationship between the parent-end router device and each child-end device;
wherein the at least one child-end device has limited energy resources and includes a wireless transmitter configured to send the trigger for the proxy search procedure, a wireless receiver configured to receive at least an acknowledgement message and a processor configured to track the acknowledgement message and trigger the proxy search procedure.

19. The parent-end router device of claim 18, wherein the network is an 802.15.4/ZigBee network.

20. A method for wireless communication in a network, wherein the network includes a parent-child relationship between a child-end device and its parent-end router device, the method comprising:
- sending, via the child-end device which is batteryless, all communication to the parent-end router for forwarding to a final destination, wherein the child-end device does not know the identity of the parent-end router during said communication;
- when an acknowledgement message from an old parent-end router configured to relay communication between the child-end device and the network is not received during said communication, sending a trigger to enable a proxy search procedure;
- receiving, at a first parent-end router device, the trigger for the proxy search procedure,
- in response to the trigger for the proxy search procedure, determining whether the first parent-end router device fulfills a condition for acting as a new proxy router for the child-end device in place of the old parent-end router;
- appointing the first router device as the new parent-end router for the child-end device when the first parent-end router device fulfills the condition.

* * * * *